UNITED STATES PATENT OFFICE.

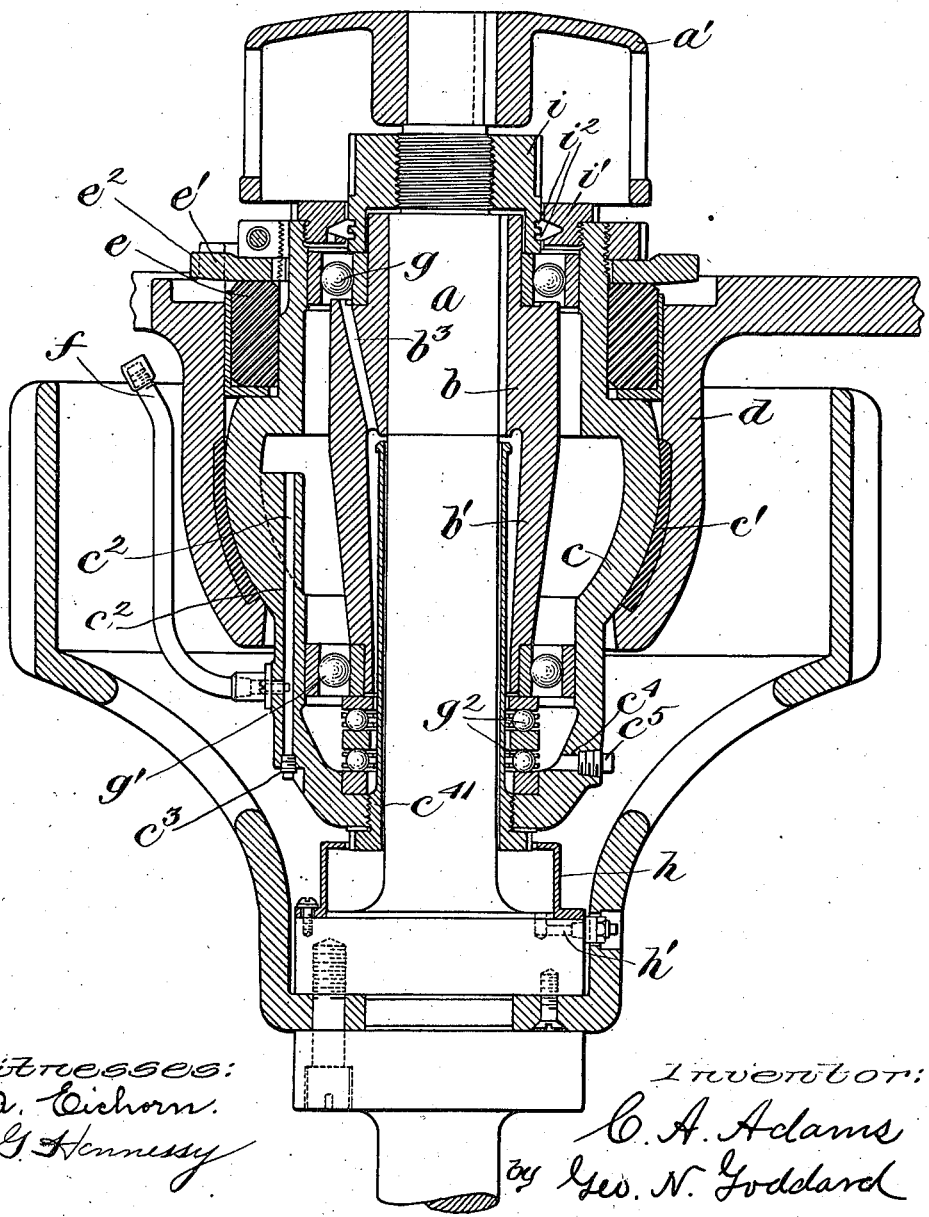

COMFORT A. ADAMS, OF CAMBRIDGE, MASSACHUSETTS, ASSIGNOR TO AMERICAN TOOL & MACHINE COMPANY, OF BOSTON, MASSACHUSETTS, A CORPORATION OF MASSACHUSETTS.

BEARING FOR CENTRIFUGAL MACHINES.

1,192,823.  Specification of Letters Patent.  Patented July 25, 1916.

Application filed January 26, 1911. Serial No. 604,770.

*To all whom it may concern:*

Be it known that I, COMFORT A. ADAMS, citizen of the United States, and resident of Cambridge, Massachusetts, county of Middlesex, have invented certain new and useful Improvements in Bearings for Centrifugal Machines, of which the following is a specification.

This invention relates to centrifugal machines and is intended to provide a practical and efficient bearing for sustaining the stress and strains encountered in that type of centrifugal machines in which the basket shaft is suspended in bearings carried by an oscillatory head or member which is supported in an overhead bracket.

The invention consists in a construction and arrangement by which the strain of the oscillatory movement of the basket is transmitted to the oscillatory head with a minimum of friction and a minimum flexing of the parts to avoid binding, while at the same time affording a convenient and effective means for keeping the bearings lubricated, without permitting the admission of dust or dirt to the bearings and without subjecting the resilient buffer to the disintegrating action of the oil; furthermore the oscillatory supporting bearing itself is kept free from lubrication so as to afford a more substantial resistance to the oscillation of the basket than in the case where the oil comes in contact with the spherical bearing, which permits this oscillation.

In the accompanying drawings I have illustrated the preferred construction embodying the principles of this invention.

The figure of the drawings shows a central vertical section of the upper end of the basket supporting shaft and its supporting parts.

In the practice of my invention I employ a solid basket carrying shaft $a$ which in this case is provided at its upper end with a coupling member $a'$ rigidly secured thereto, through which rotary motion is imparted by any suitable driving mechanism. A short distance below the upper end of the shaft a bearing sleeve $b$ is rigidly secured thereto. Said bearing sleeve has an annular downward extension $b'$ whose bore is of substantially larger diameter than the diameter of the shaft which it surrounds in order to leave a clearance or annular space separating this downward extension from the shaft itself. This bearing sleeve is supported in a hollow oscillatory head $c$ which has an external spherical bearing surface $c'$ resting in the socket of a fixed hanger $d$ so as to form a ball and socket engagement therewith. This spherical bearing is formed intermediate of the ends of the oscillatory head $c$, said head being extended upward and downward to afford support for the bearings to be hereinafter described.

Between the upper portion of the oscillatory head $c$ and the adjacent surrounding portions of the fixed hanger $d$ is interposed a yielding buffer preferably in the form of a solid rubber ring $e$ which is clamped or compressed downward by means of the holding collar $e'$, which is secured to the upper portion of the oscillatory head and has engagement with the hanger $d$ as shown at $e^2$ to prevent rotary motion of said oscillatory head, while permitting it to oscillate.

The internal diameter of the oscillatory head $c$ is substantially larger than the external diameter of the bearing sleeve $b$, so as to form a fairly capacious reservoir, to which oil may be furnished by means of a supply pipe $f$ communicating with an oil inlet passage $c^2$, which latter is normally closed by a removable stop plug $c^3$. At its bottom this reservoir is provided with an outlet $c^4$ normally closed by a stop plug $c^5$, which may be removed to permit the drawing off of sediment from the bottom of the oil chamber. The oscillatory head $c$ is provided at its bottom with an internal vertical sleeve $c^{4'}$ which passes up through the annular space between the lower extension $b'$ of the sleeve $b$ and the adjacent shaft, so as to form an internal wall of an annular oil chamber the external wall of which consists of the head $c$. This external sleeve $c^{41}$ extends practically to the top of said annular space between the shaft and the bearing sleeve. Between the upper end of the bearing sleeve and the upper portion of the bearing head surrounding the same is interposed an anti-friction bearing $g$ comprising two concentric rings with the interposed series of bearing balls. A similar bearing $g'$ is interposed between the lower end of the bearing sleeve and the adjacent portion of the surrounding wall formed by the oscillatory head $c$. These two bearings support the lateral thrust caused by oscillation of the basket and transmit the same to the oscillatory head $c$ with a minimum amount of friction. Below the bottom of the bearing sleeve is arranged a double-decked thrust bearing $g^2$ comprising anti-friction balls and concentric rings which bearing rests above the bottom of the oil chamber formed by the oscillatory head and supports the downward thrust of the sleeve by which the weight of the rotary shaft and its basket is sustained.

Between the sleeve $c^{41}$ and the basket shaft $a$ the slightest practicable clearance is left so as to avoid as much as possible any ingress of dust or sugar fumes between these two parts; but in order to provide for any drip of oil between these parts a closed drip cup $h$ is provided, this being secured to the flange portion of the shaft below the oscillatory head and being provided with a normally closed draw off $h'$.

The thrust nut $i$ which is secured to the shaft $a$ immediately below the coupling member $a'$ together with the surrounding ring $i'$ secured to the upper end of the oscillatory head serves to practically close the space between the upper end of the oscillatory head and the adjacent portion of the bearing sleeve and the shaft so as to exclude dirt and other foreign matter from the oil reservoir, as well as to exclude the fumes of the sugar. To prevent any seepage of oil the nut is provided on its exterior face with two adjacent concentric grooves $i^2$ separated by an intermediate horizontal shoulder while the internal face of the ring $i'$ is formed with an annular groove for a like purpose.

To provide for the lubrication of the upper lateral anti-friction bearing, I form in the upper portion of the bearing sleeve $b$ an oblique oil duct or passage $b^3$ which affords communication between the annular space inside of the downward extension $b'$ of said sleeve, and the space between the exterior of the upper portion of said sleeve and the surrounding wall of the oil chamber. The employment of said oil passages $b^3$ combined with the conical conformation of the inside of the bearing sleeve operates with the aid of centrifugal force to give a continuous flow of oil to the upper bearing to keep the same well lubricated.

What I claim is:

1. In a centrifugal machine the combination of a socketed hanger, a non-rotating oscillatory suspension head seated therein, a solid rotary basket shaft, an elongated bearing sleeve secured to said shaft, a rotary thrust-bearing sustaining the lower end of said sleeve, upper and lower anti-friction lateral bearings interposed respectively between the upper and lower ends of said sleeve and the surrounding opposed portion of the inner wall of said bearing head, the said lateral bearings being disposed above the level of the thrust bearing and on opposite sides of the center of oscillation, and means for keeping immersed in oil the lower bearing and for supplying oil to the upper bearing, substantially as described.

2. In a centrifugal machine the combination of the hollow oscillatory suspension head containing an anti-friction thrust bearing, a solid basket-carrying shaft, a surrounding sleeve secured thereto, a sustaining thrust-bearing beneath said sleeve, an oil retaining quill carried by said head and extended upward between the shaft and lower end of the sleeve to form an oil well within the suspension head, lateral anti-friction bearings arranged above and below the upper end of said quill the said sleeve being formed with a centrifugally acting oil duct for supplying oil to the upper lateral bearing, substantially as described.

3. In a centrifugal machine the combination of the oscillatory suspension head forming a hollow oil reservoir formed with an overhanging shoulder to limit the upward flow of oil, a rotary basket shaft supported on a thrust bearing contained therein, upper and lower lateral bearings by which the oscillation of the shaft is imparted to the head without lost motion, a quill secured in the head and extending upward around the shaft inside of the lower bearings, said head being provided with an oblique upward and outwardly extending duct for leading the oil by centrifugal force from the exterior of said quill to said upper bearing, substantially as described.

4. The combination of the hollow oscillatory suspension head, a rotary basket shaft, an elongated hollow sleeve whose upper portion fits snugly the inclosed portion of the shaft and whose lower portion is of larger diameter to form a clearance space around the shaft, an anti-friction thrust bearing interposed between the lower end of the sleeve and bottom of said head, a quill secured in the lower end of said head and extending upward between the lower end of the sleeve and the shaft, upper and lower lateral bearings interposed between the upper and lower ends of the sleeve and the surrounding wall of the bearing head, an oil duct leading from the space between the quill and the sleeve to the upper lateral bearing, the interior of said head being formed with an annular shoulder to prevent the upward flow of oil on its interior face above the level of said quill, substantially as described.

In witness whereof, I have subscribed the above specification.

COMFORT A. ADAMS.

In the presence of—
G. A. ROCKWELL,
GEO. N. GODDARD.